[12] United States Patent
Yokoo et al.

(10) Patent No.: US 9,793,841 B2
(45) Date of Patent: Oct. 17, 2017

(54) SENSOR-LESS CIRCUIT AND METHOD FOR DETECTING A ROTOR POSITION

(71) Applicant: Semiconductor Components Industries, LLC, Phoenix, AZ (US)

(72) Inventors: Satoshi Yokoo, Ota (JP); Atsuhiro Ichikawa, Ibigun Oono-cyou (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 301 days.

(21) Appl. No.: 14/838,834

(22) Filed: Aug. 28, 2015

(65) Prior Publication Data

US 2016/0320207 A1   Nov. 3, 2016

Related U.S. Application Data

(60) Provisional application No. 62/154,748, filed on Apr. 30, 2015.

(51) Int. Cl.
*H02P 6/00* (2016.01)
*H02P 6/182* (2016.01)
*H02P 6/18* (2016.01)
*G01D 5/20* (2006.01)

(52) U.S. Cl.
CPC .............. *H02P 6/182* (2013.01); *H02P 6/187* (2013.01); *G01D 5/2046* (2013.01)

(58) Field of Classification Search
CPC ....................................................... H02P 6/182

USPC ...................................................... 318/400.01
See application file for complete search history.

(56) References Cited

U.S. PATENT DOCUMENTS 5,783,917 A *  7/1998  Takekawa ............... H02P 6/182
                                                         318/400.1
8,508,307 B2     8/2013  Mitsuda et al.

FOREIGN PATENT DOCUMENTS

JP       2012-010262     12/2012
JP       2014-106572     6/2014

* cited by examiner

*Primary Examiner* — David S Luo
(74) *Attorney, Agent, or Firm* — Rennie William Dover (57) ABSTRACT

In accordance with an embodiment, a sensor-less detection circuit is provided that includes a first voltage adjustment circuit coupled for receiving an induced voltage and a second voltage adjustment circuit coupled for receiving a common voltage. A differential amplifier has an inverting input terminal coupled to the first voltage adjustment circuit and a noninverting input terminal coupled to the second voltage adjustment circuit. In accordance with another embodiment, a method for detecting a motor rotor position is provided that includes receiving a first back electromotive force that is at a first voltage level and shifting the first back electromotive force from the first voltage level to a second voltage level. The first back electromotive force is filtered to generate a first filtered voltage; and a first motor rotor position signal is generated in response to comparing the first filtered voltage with a reference voltage.

20 Claims, 6 Drawing Sheets

SENSOR-LESS CIRCUIT AND METHOD FOR DETECTING A ROTOR POSITION

BACKGROUND

The present invention relates, in general, to electronics and, more particularly, to a brushless DC motor.

Brushless Direct Current (DC) motors are used in a variety of applications including disc drives, compact disc players, digital video disc players, scanners, printers, plotters, actuators used in the automotive and aviation industries, etc. Typically, multiple phase motors include a stationary portion or stator that produces a rotating magnetic field and a non-stationary portion or rotor in which torque is created by the rotating magnetic field. The torque causes the rotor to rotate which in turn causes a shaft connected to the rotor to rotate. At start-up it is desirable to detect the position and rotation rate of the brushless DC motor's rotor. In a brushless DC motor having sensors, the rotor position and its rotation rate may be detected and controlled using Hall sensors. However, the accuracy of Hall sensors is influenced by their operating environment, which decreases the accuracy of the measurements they provide. In sensorless brushless DC motors, the position of the rotor is detected using a Back ElectroMotive Force (BEMF) signal. A drawback with using a BEMF signal is that the BEMF is typically compared with a voltage generated by a high voltage PNP circuit element, which is not suitable for miniaturization using monolithic integrated circuit processes. Another drawback is that the comparator is limited to comparing positive voltages. Another drawback with using a BEMF signal is that it becomes very small when the rotor is moving slowly or not at all.

Accordingly, it would be advantageous to have a method and structure for detecting a rotor position that accommodates a high input voltage range and has a high noise immunity. It is desirable for the method and structure to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or an anode of a diode, and a control electrode means an element of the device that controls current flow through the device such as a gate of an MOS transistor or a base of a bipolar transistor. Although the devices are explained herein as certain n-channel or p-channel devices, or certain n-type or p-type doped regions, a person of ordinary skill in the art will appreciate that complementary devices are also possible in accordance with embodiments of the present invention. It should be noted that a doped region may be referred to as a dopant region. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of being exactly as described.

DETAILED DESCRIPTION

Generally, embodiments of the present invention include sensor-less circuits configured to detect a position of a motor rotor and a method for detecting the position of the motor rotor. In accordance with an embodiment, the sensor-less detection circuit comprises a first voltage adjustment circuit, a second voltage adjustment circuit, a differential amplifier, and a comparator. The first voltage adjustment circuit has a first terminal and a second terminal, wherein the first terminal of the first voltage adjustment circuit is coupled for receiving a first induced voltage, a second induced voltage, or a third induced voltage. The second voltage adjustment circuit has a first terminal coupled for receiving a common voltage and a second terminal. The differential amplifier has an inverting input terminal, a noninverting input terminal, and an output terminal, wherein the inverting input terminal of the differential amplifier is connected to the second terminal of the first voltage adjustment circuit and the noninverting input terminal of the differential amplifier is connected to the second terminal of the second voltage adjustment circuit. The comparator has a first input terminal, a second input terminal, and an output terminal, wherein the first input terminal of the comparator is coupled to the output terminal of the differential amplifier.

In accordance with another embodiment, a sensor-less circuit is configured to detect a position of a motor rotor and comprises an active filter, a first level shifting circuit, a second level shifting circuit, and a determination circuit. The active filter has a differential input and an output, wherein the differential input includes an inverting input terminal and a noninverting input terminal. The first level shifting circuit has a first terminal and a second terminal, where the first terminal is coupled for receiving a first back electromotive force and the second terminal is switchably connected to the inverting input terminal of the active filter. The second level shifting circuit has a first terminal and a second terminal, wherein the first terminal is connected for receiving a common voltage and the second reference terminal is switchably connected to the noninverting input terminal of the active filter. The determination circuit having a first input terminal, a second input terminal, and an output terminal, wherein the first input terminal is connected to the output of the active filter.

In accordance with another embodiment, a method for detecting a motor rotor position is provided that comprises receiving a first back electromotive force at a first voltage level and shifting the first back electromotive force from the first voltage level to a second voltage level. The first back electromotive force at the second voltage level is filtered to generate a first filtered voltage. A first motor rotor position signal is generated in response to comparing the first filtered voltage with a reference voltage.

Figure 1:
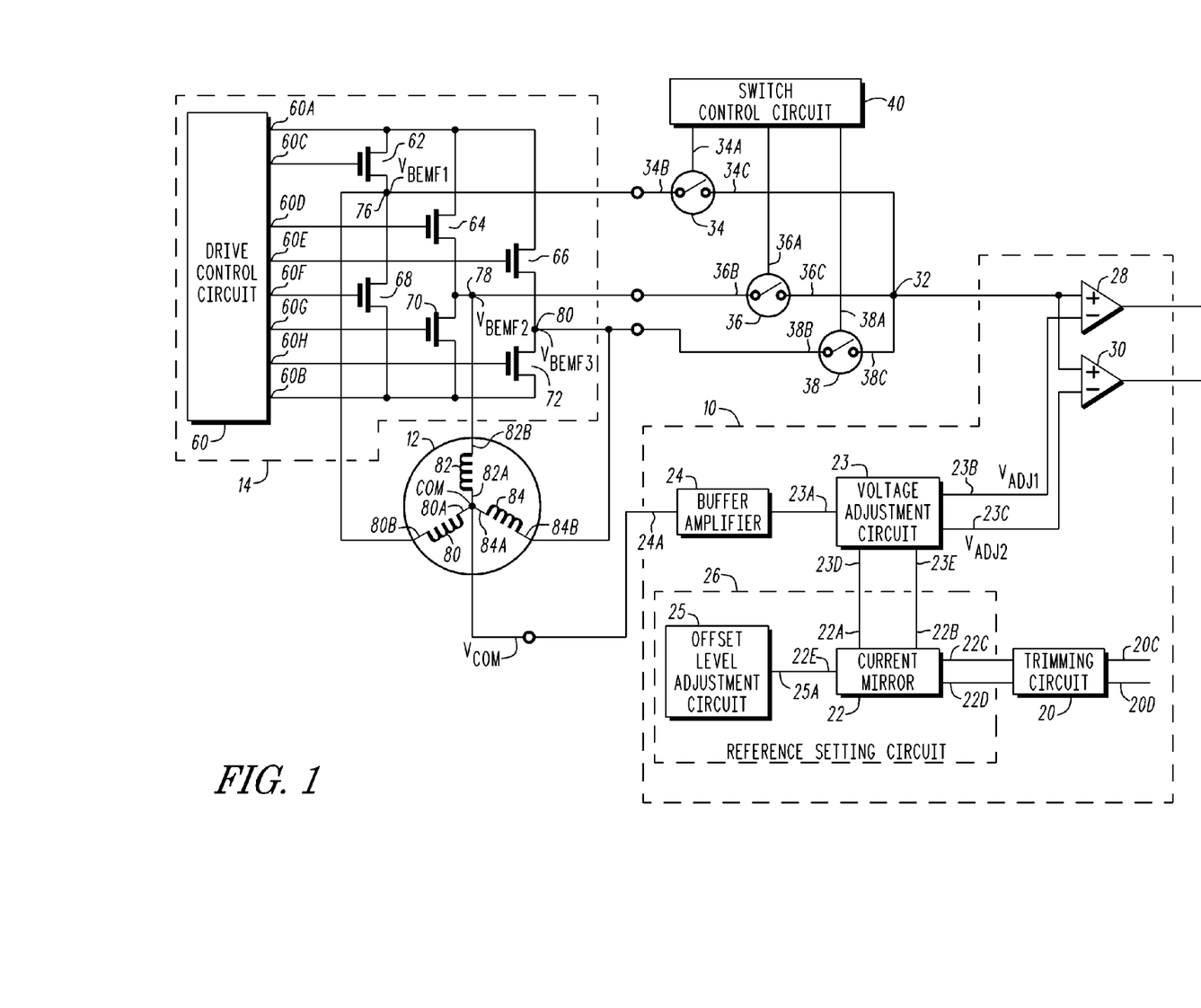
FIG. 1 is a circuit schematic of a sensor-less detection circuit coupled to a Brushless Direct Current (BLDC) motor and to a motor drive circuit in accordance with an embodiment of the present invention.

FIG. 1 illustrates a circuit schematic of a detection circuit 10 coupled to a Brushless Direct Current (BLDC) motor 12 and to a motor drive circuit 14. Detection circuit 10 is comprised of a trimming circuit 20, a voltage adjustment circuit 23, a buffer amplifier 24, a reference setting circuit 26, a comparator 28, and a comparator 30. Voltage adjustment circuit 23 has an input terminal 23A and output terminals 23B, 23C, 23D, and 23E, where input terminal 23A is connected to the output terminal of buffer amplifier 24, output terminal 23B is connected to the inverting input terminal of comparator 28, output terminal 23C is connected to the inverting input terminal of comparator 30, output terminal 23D is connected to a terminal 22A of current mirror 22 and output terminal 23E is connected to a terminal 22B of current mirror 22. Reference setting circuit 26 is comprised of an offset level adjustment circuit 25 having an input terminal 25A connected to an input terminal 22E of a current mirror 22. Current mirror 22 includes terminals 22A, 22B, 22C, and 22D. Terminals 22A and 22B serve as output terminals of reference setting circuit 26. Trimming circuit 20 has terminals 20A, 20B, 20C, and 20D, where terminal 20A is connected to terminal 22C of current mirror 22, terminal 20B is connected to terminal 22D of current mirror 22, terminal 20C serves as an input terminal to trimming circuit 20, and terminal 20D serves as an output terminal of trimming circuit 20.

Comparator 28 and comparator 30 each have a noninverting input terminal connected to a node 32 for receiving a back electromotive force (BEMF). The back electromotive force is also referred to as an induced voltage.

In accordance with an embodiment, node 32 is coupled for receiving back electromotive force voltages $V_{BEMF1}$, $V_{BEMF2}$, and $V_{BEMF3}$ through switches 34, 36, and 38, respectively. By way of example, electromotive force voltages $V_{BEMF1}$, $V_{BEMF2}$, and $V_{BEMF3}$ appear at nodes 76, 78, and 80, respectively. Thus, node 76 is connected to node 32 through switch 34; node 78 is connected to node 32 through switch 36; and node 80 is connected to node 32 through switch 38. More particularly, nodes 76, 78, and 80 are switchably coupled to node 32. Switch 34 has a control terminal 34A coupled for receiving a control signal from a switch control circuit 40, a conduction terminal 34B connected to node 76, and a conduction terminal 34C connected node 32. Switch 36 has a control terminal 36A coupled for receiving a control signal from switch control circuit 40, a conduction terminal 36B connected to node 78, and a conduction terminal 36C connected node 32. Switch 38 has a control terminal 38A coupled for receiving a control signal from a switch control circuit 40, a conduction terminal 38B connected to node 80, and a conduction terminal 38C connected node 32.

Motor drive circuit 14 includes a drive control circuit 60 coupled to drive transistors 62, 64, 66, 68, 70, and 72, where drive control circuit 60 is configured for driving transistors 62-72. Each drive transistor 62-72 has a drain, a source, and a gate. The drains of transistors 62, 64, and 66 are commonly connected together and to a terminal 60A of drive control circuit 60 and the sources of transistors 68, 70, and 72 are commonly connected together and to a terminal 60B of drive control circuit 60. The source of transistor 62 is connected to the drain of transistor 68 and to terminal 34B of switch 34 to form a node 76. Back electromotive force $V_{BEMF1}$ may be generated at node 76. The source of transistor 64 is connected to the drain of transistor 70 and to terminal 36B of switch 36 to form a node 78. Back electromotive force $V_{BEMF2}$ may be generated at node 78. The source of transistor 66 is connected to the drain of transistor 72 and to terminal 38B of switch 38 to form a node 80. Back electromotive force $V_{BEMF3}$ may be generated at node 80. It should be noted that back electromotive force $V_{BEMF1}$ may appear at nodes 76, 78, and 80; likewise, back electromotive force $V_{BEMF2}$ may appear at nodes 76, 78, and 80 and back electromotive force $V_{BEMF3}$ may appear at nodes 76, 78, and 80. The gate of transistor 62 is connected to a terminal 60C of drive control circuit 60; the gate of transistor 64 is connected to a terminal 60D of drive control circuit 60; the gate of transistor 66 is connected to a terminal 60E of drive control circuit 60; the gate of transistor 68 is connected to a terminal 60F of drive control circuit 60; the gate of transistor 70 is connected to a terminal 60G of drive control circuit 60; and the gate of transistor 72 is connected to a terminal 60H of drive control circuit 60.

BLDC motor 12 includes inductive elements 80, 82, and 84. Inductive element 80 has a terminal 80A commonly connected to terminals 82A and 84A of inductive elements 82 and 84, respectively, to form a common node COM. Inductive element 80 has a terminal 80B connected to node 76, inductive element 82 has a terminal 82B connected to node 78, and inductive element 84 has a terminal 84B connected to node 80.

In operation, drive control circuit 60 generates drive control signals at output terminals 60A, 60B, 60C, 60D, 60E, 60F, 60G, and 60H. More particularly, drive control circuit 60 generates a bias voltage at output terminal 60A and a bias voltage at output terminal 60B. By way of example, the bias voltage at output terminal 60B is ground. Drive control circuit 60 further generates gate voltages that appear at the gates of transistors 62-72. For example, drive control circuit 60 generates a gate voltage for transistor 62 at output terminal 60C, a gate voltage for transistor 64 at output terminal 60D, a gate voltage for transistor 66 at output terminal 60E, a gate voltage for transistor 68 at output terminal 60F, a gate voltage for transistor 70 at output terminal 60G, and a gate voltage for transistor 72 at output terminal 60H. In response to the drive signals at output terminals 60A-60H, BEMF signals $V_{BEMF1}$, $V_{BEMF2}$, and $V_{BEMF3}$ are generated at nodes 76, 78, and 80, respectively. In addition, a common voltage $V_{COM}$ is generated at a common node COM.

By way of example, in a phase commonly referred to as a U-phase, a BEMF signal $V_{BEMF1}$ appears at node 76, whereas BEMF signals $V_{BEMF2}$ and $V_{BEMF3}$ are absent from nodes 78 and 80, respectively. Switch control circuit 40 generates control signals that close switch 34 and opens switches 36 and 38. More particularly, switch control circuit 40 generates a control signal at control terminal 34A to close switch 34, i.e., connect terminal 34B to terminal 34C of switch 34, a control signal at control terminal 36A to open switch 36, i.e., to disconnect terminal 36B from terminal 36C of switch 36, and a control signal at control terminal 38A to open switch 38, i.e., to disconnect terminal 38B from terminal 38C of switch 38. In response to switch 34 being closed, voltage $V_{BEMF1}$ appearing at conduction terminal 34B is transmitted to conduction terminal 34C and to the noninverting inputs of comparators 28 and 30.

Common voltage $V_{COM}$ appearing at node COM is transmitted to input terminal 24A of buffer amplifier 24, which buffer amplifier 24 transmits the voltage $V_{COM}$ buffered by buffer amplifier 24 to input terminal 23A of voltage adjustment circuit 23. In response to voltage $V_{COM}$ and signals from trimming circuit 20 through current mirror 22, voltage adjustment circuit 23 generates adjustment voltages $V_{ADJ1}$ and $V_{ADJ2}$ at terminals 23B and 23C, respectively, which are transmitted to the inverting inputs of comparators 28 and 30, respectively. Comparators 28 and 30 generate output signals at their outputs that serve as zero-cross signals.

By way of example, a phase commonly referred to as a V-phase, a BEMF signal $V_{BEMF2}$ appears at node 78, whereas BEMF signals $V_{BEMF1}$ and $V_{BEMF3}$ are absent from nodes 76 and 80, respectively. Switch control circuit 40 generates control signals that close switch 36 and opens switches 34 and 38. More particularly, switch control circuit 40 generates a control signal at control terminal 36A to close switch 36, i.e., to electrically connect terminal 36B to terminal 36C of switch 36, a control signal at control terminal 34A to open switch 34, i.e., to disconnect terminal 34B from terminal 34C of switch 34, and a control signal at control terminal 38A to open switch 38, i.e., to disconnect terminal 38B from terminal 38C of switch 38. In response to switch 36 being closed, voltage $V_{BEMF2}$ appearing at conduction terminal 36B is transmitted to conduction terminal 36C and to noninverting input 28A of comparator 30.

Common voltage $V_{COM}$ appearing at node COM is transmitted to input terminal 24A of buffer amplifier 24, which amplifier 24 transmits the voltage $V_{COM}$ to input terminal 22A of current mirror 22. In response to voltage $V_{COM}$ and signals from trimming circuit 20 through current mirror 22, voltage adjustment circuit 23 generates adjustment voltages $V_{ADJ1}$ and $V_{ADJ2}$ at terminals 23B and 23C, respectively, which are transmitted to the inverting inputs of comparators 28 and 30, respectively. Comparators 28 and 30 generate output signals at their outputs that serve as zero-cross signals.

By way of example, in a phase commonly referred to as a W-phase, a BEMF signal $V_{BEMF3}$ appears at node 80, whereas BEMF signals $V_{BEMF1}$ and $V_{BEMF2}$ are absent from nodes 76 and 78, respectively. Switch control circuit 40 generates control signals that close switch 38 and opens switches 34 and 36. More particularly, switch control circuit 40 generates a control signal at control terminal 38A to close switch 38, i.e., connect terminal 38B to terminal 38C of switch 38, a control signal at control terminal 34A to open switch 34, i.e., to disconnect terminal 34B from terminal 34C of switch 34, and a control signal at control terminal 36A to open switch 36, i.e., to disconnect terminal 36B from terminal 36C of switch 36. In response to switch 38 being closed, voltage $V_{BEMF3}$ appearing at conduction terminal 38B is transmitted to conduction terminal 38C and to the noninverting inputs of comparators 28 and 30.

Common voltage $V_{COM}$ appearing at node COM is transmitted to input terminal 24A of buffer amplifier 24, which amplifier 24 transmits the voltage $V_{COM}$ to input terminal 22A of current mirror 22. In response to voltage $V_{COM}$ and signals from trimming circuit 20 through current mirror 22, voltage adjustment circuit 23 generates adjustment voltages $V_{ADJ1}$ and $V_{ADJ2}$ at terminals 23B and 23C, respectively, which are transmitted to the inverting inputs of comparators 28 and 30, respectively. Comparators 28 and 30 generate output signals at their outputs that serve as zero-cross signals.

Figure 2:
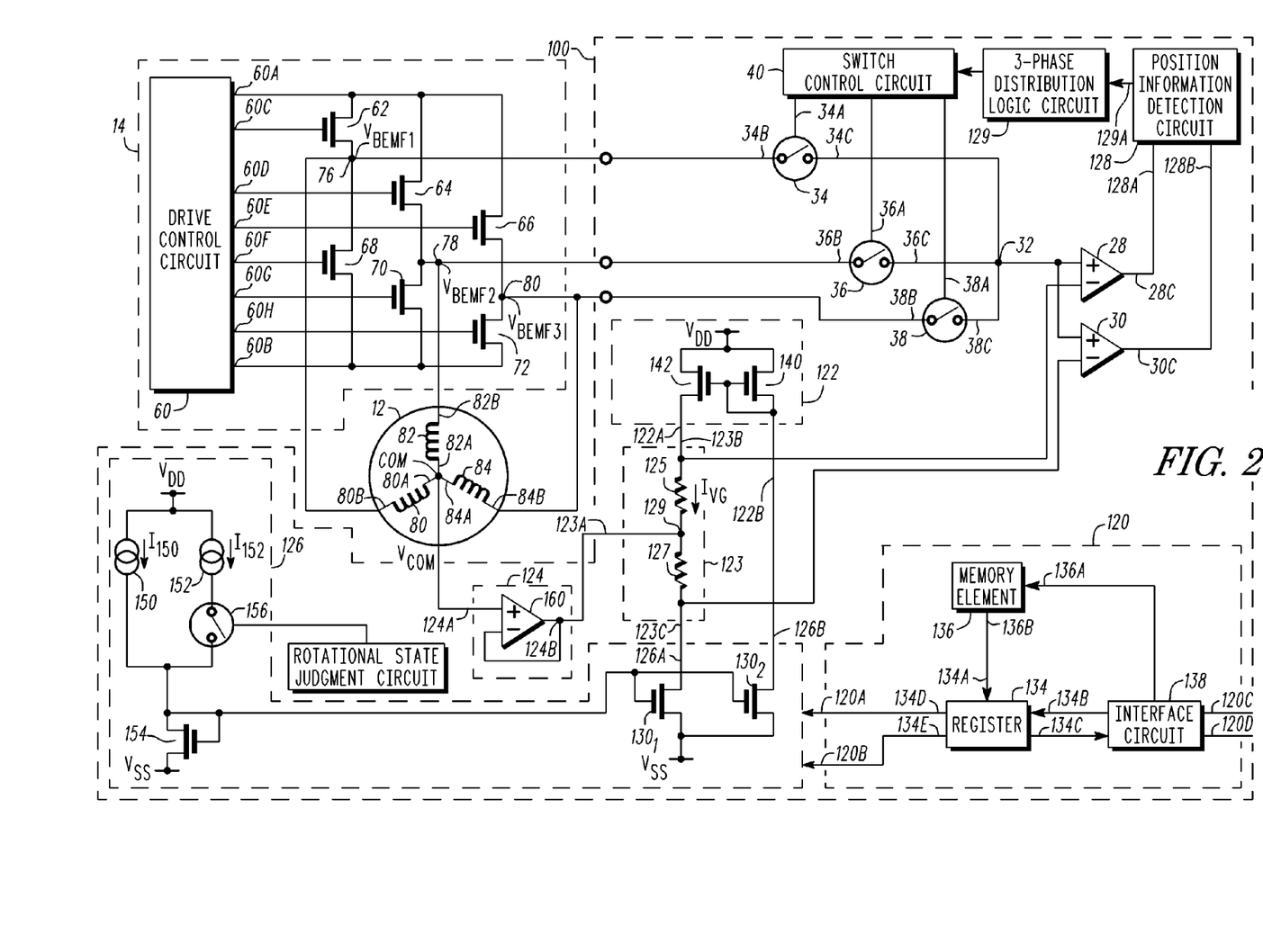
FIG. 2 is a circuit schematic of a sensor-less detection circuit coupled to a Brushless Direct Current (BLDC) motor and to a motor drive circuit in accordance with another embodiment of the present invention.

FIG. 2 illustrates a circuit schematic of a detection circuit 100 coupled to a Brushless Direct Current (BLDC) motor 12 and to a motor drive circuit 14. Detection circuit 100 is comprised of a trimming circuit 120, a current mirror 122, a reference voltage generator 123, a buffer amplifier 124, a reference setting circuit 126, comparator 28, comparator 30, a switch control circuit 40, a position information detection circuit 128, and a 3-phase distribution logic circuit 129. Reference voltage generator 123 may be referred to as a voltage adjustment circuit. Trimming circuit 120 has a terminal 120A connected to reference setting circuit 126, a terminal 120B connected to reference setting circuit 126, an interface terminal 120C coupled for receiving data, and an interface terminal 120D for transmitting data from trimming circuit 120. In accordance with an embodiment, trimming circuit 120 is comprised of a register 134, a memory circuit 136, and an interface circuit 138. Register 134 has inputs 134A and 134B and outputs 134C, 134D, and 134E, where outputs 134D and 134E are coupled to transistors $130_2$ and $130_1$, respectively, of reference setting circuit 126. Memory element 136 has an input 136A and an output 136B, which output 136B is connected to input 134A of register 134. By way of example, memory element 136 is a one time programmable memory element. Interface circuit 138 has an output connected to input 136A of memory element 136, an output connected to input 134B of register 134, an input connected to output 134C of register 134, an input that serves as input 120C of trimming circuit 120 and coupled for receiving data signals and an output that serves as output 120D of trimming circuit 120 and coupled for transmitting data signals.

Voltage adjustment circuit 123 further includes an input terminal 123A connected to an output terminal 124B of buffer amplifier 124, a terminal 123B connected to an inverting input terminal of comparator 28, and a terminal 123C commonly connected to an inverting input of comparator 30 and to output 126A of reference setting circuit 126, i.e., to the drain of transistor $130_1$. In particular, voltage adjustment circuit 123 is comprised of a resistor 125 connected to a resistor 127. Resistors 125 and 127 each have a terminal commonly connected to each other to form a node 129, where node 129 may serve as input terminal 123A of voltage adjustment circuit 123. The other terminal of resistor 125 serves as terminal 123B of voltage adjustment circuit 123 and the other terminal of resistor 127 serves terminal 123C of voltage adjustment circuit 123. Terminal 123B is connected to terminal 122A of current mirror 122 and the drain of transistor $130_2$ is connected to terminal 122B of current mirror 122.

Comparator 28 has a noninverting input terminal coupled for receiving an induced voltage signal at a node 32 and comparator 30 has a noninverting input terminal coupled for receiving the induced voltage at node 32. The induced voltage is also referred to as a back electromotive force (BEMF).

Current mirror 122 includes transistors 140 and 142 where each transistor 140 and 142 has a gate terminal, a drain terminal, and a source terminal. The source terminals of transistors 140 and 142 are commonly connected together and for receiving a source of operating potential $V_{DD}$ and the gate terminals of transistors 140 and 142 are commonly connected together and to the drain terminal of transistor 140 to form terminal 122B of current mirror 122. The drain terminal of transistor 142 serves as, or alternatively, is connected to terminal 122A of current mirror 122.

Reference setting circuit 126 is comprised of current sources 150 and 152, transistors $130_1$, $130_2$, and 154, and a switch 156. Current sources 150 and 152 each have a pair of terminals, wherein a terminal of current source 150 is connected to a terminal of current source 152 and coupled for receiving a source of operating potential $V_{DD}$. The other terminal of current source 150 is connected to a drain terminal of transistor 154 and to a gate terminal of transistor 154. Switch 156 has a conduction terminal connected to a terminal of current source 152, a conduction terminal connected to the drain terminal of transistor 154, and a control terminal connected to an output terminal of a rotational state judgment circuit 155. Transistor $130_1$ has a drain that serves as terminal 126A of reference setting circuit 126, a gate connected to the commonly connected gate and drain of transistor 154, and a source coupled for receiving a source of operating potential $V_{SS}$. Transistor $130_2$ has a drain that serves as terminal 126B of reference setting circuit 126, a gate connected to the commonly connected gate and drain of transistor 154, and a source coupled for receiving a source of operating potential $V_{SS}$. It should be noted that current sources 150 and 152 may be implemented as transistors configured as a current source and that operating potential $V_{SS}$ may be ground.

In accordance with an embodiment, buffer amplifier 124 is comprised of an amplifier 160 having a noninverting input terminal that serves as input terminal 124A of buffer amplifier 124 and an inverting input terminal connected to the output terminal of amplifier 160 to form an output terminal 124B of buffer amplifier 160.

Detection circuit 100 further includes a position information detection circuit 128 having an input terminal 128A connected to the output terminal 28C of comparator 28, an input terminal 128B connected to output terminal 30C of comparator 30, and an output terminal connected to an input terminal 129A of a 3-phase distribution logic circuit 129. 3-phase distribution logic circuit 129 has an output connected to an input of switch control circuit 40.

In accordance with an embodiment, node 32 is coupled for receiving back electromotive force voltages $V_{BEMF1}$, $V_{BEMF2}$, and $V_{BEMF3}$ through switches 34, 36, and 38, respectively. More particularly, node 76 is connected to node 32 through switch 34; node 78 is connected to node 32 through switch 36; and node 80 is connected to node 32 through switch 38. Thus, nodes 76, 78, and 80 are switchably coupled to node 32. Embodiments of switches 34, 36, and 38 and connection to nodes 76, 78, and 80, respectively, and switch control circuit 40 have been described with reference to FIG. 1. Similarly, embodiments of motor drive circuit 14 and BLDC motor 12 have been described with reference to FIG. 1.

In operation, a method for sensorlessly detecting a rotor position of a motor includes generating a back electromotive force voltage at one or more of nodes 76, 78, and 80. The back electromotive force voltage is transferred to node 32 through switches 34, 36, and 38 under the control of switch control circuit 40. It should be noted that switch control circuit 40 generates control switches 34, 36, and 38 so that a single switch of switches 34, 36, and 38 is closed at a time, i.e., one of the back electromotive force voltages is transferred to node 32 at a time. The back electromotive force voltage appearing at node 32 also appears at the noninverting inputs of comparators 28 and 30. For example, a back electromotive force voltage is generated at node 76 in response to a drive signal from motor drive circuit 14. The back electromotive force signal is transferred or transmitted to the noninverting input terminals of comparators 28 and 30.

An upper reference voltage is generated at the inverting input of comparator 28 in response to a reference voltage and a current and a lower reference voltage is generated at the inverting input terminal of comparator 30 in response to the reference voltage and the current. Comparator 28 compares the back electromotive force voltage with the upper reference voltage to generate a comparison voltage at the output terminal of comparator 28. Comparator 30 compares the back electromotive force voltage with the lower reference voltage to generate a comparison voltage at the output terminal of comparator 30. A zero-cross detection signal is generated in response to the comparison voltage at the output terminal of comparator 28 and to the comparison voltage at the output terminal of comparator 30. Position information detection circuit 128 generates a position indication signal in response to the zero-cross detection signal.

In accordance with embodiments, the upper reference voltage and the lower reference voltage may be generated by reference voltage generation circuit 123. More particularly, common voltage $V_{COM}$ is input into buffer amplifier 124, which generates a buffered common voltage $V_{BCOM}$ that appears at node 129. A current $I_{VG}$ flowing through voltage generation circuit 123 generates a voltage drop across resistor 125 and a voltage drop across resistor 127. Thus, the voltage at the inverting input terminal of comparator 28 is given by $V_{BCOM}+R_{125}*I_{VG}$ and the voltage at the inverting input terminal of comparator 30 is given by $V_{BCOM}-R_{127}*I_{VG}$, where $R_{125}$ is the resistance value of resistor 125 and $R_{127}$ is the resistance value of resistor 127. It should be noted that if the resistance value $R_{125}$ of resistor 125 equals the resistance value $R_{127}$ of resistor 127, the voltage across resistor 125 is equal to the voltage across resistor 127. In this case the voltage about voltage $V_{BCOM}$ is symmetric.

In the embodiment shown in FIG. 2, current $I_{VG}$ is generated in response to the currents at output terminals 126A and 126B of reference setting circuit 126. The current flowing through output terminals 126A and 126B may be further adjusted or refined in response to signals from reference setting circuit 126. More particularly, switch 156 may be configured to be open so that current $I_{150}$ is mirrored to output terminal 126A; alternatively, switch 156 may be configured to be closed so that a current equal to the sum of currents $I_{150}$ and $I_{152}$ is mirrored to output terminal 126A. Mirroring current $I_{150}$ to output terminal allows detecting the motor rotor position when the motor is rotating, whereas mirroring a current equal to the sum of currents $I_{150}$ and $I_{152}$ enables confirming the motor rotor position at the time of starting the motor and judging the rotational state of the motor rotor. Thus, switch 156 may be controlled to adjust the offset level of the voltage at the input terminals of comparators 28 and 30.

It should be noted that comparators 28 and 30 are referenced to the middle point of the U phase, the V phase and the W phase of the back electromotive force voltage and that they are not affected by fluctuations in the common voltage $V_{COM}$. Thus, detection circuit 100 provides a structure for determining the zero-crossing point of the back electromotive force voltage.

It should be further noted that trimming circuit 120 enables adjusting the back electromotive force voltage detection offset voltage including the input offset voltage to comparators 28 and 30.

Figure 3:
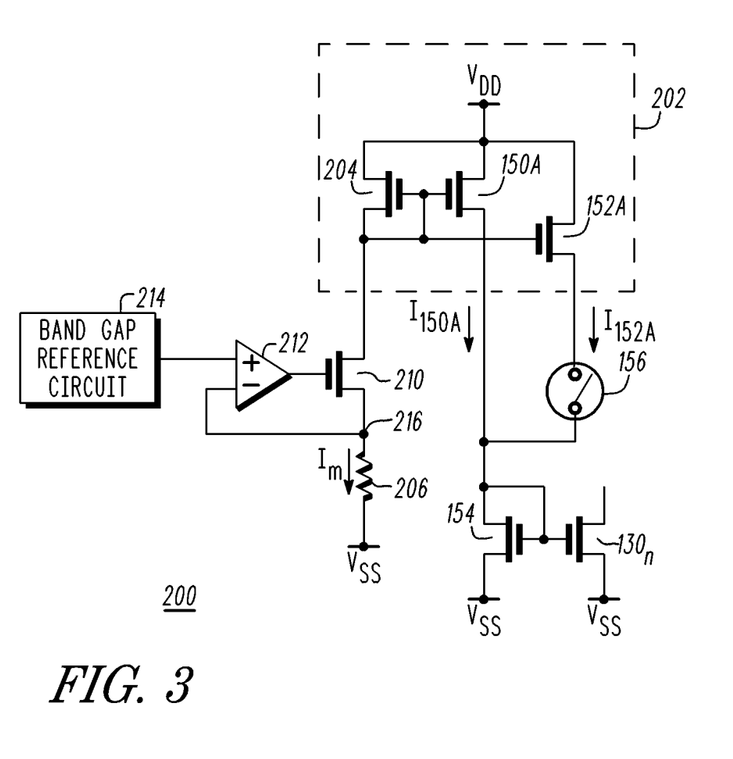
FIG. 3 is a circuit schematic of a reference setting circuit in accordance with another embodiment of the present invention.

FIG. 3 is a circuit schematic of a reference setting circuit 200 in accordance with another embodiment of the present invention. It should be noted that reference setting circuit 200 is an embodiment suitable for use as reference setting circuit 126 of FIG. 2 or reference setting circuit 26 of FIG. 1. Reference setting circuit 200 includes transistor 154 and switch 156 described with reference to FIG. 2. Reference setting circuit 200 further includes a current mirror 202 comprising transistors 204, 150A, and 152A. Thus transistors 204, 150A, and 152A are configured as a current mirror. Each transistor 204, 150A, and 152A has a gate terminal, a drain terminal, and a source terminal, wherein the gate terminals of transistors 204, 150A, and 152A are commonly connected together and the source terminals of transistors 204, 150A, and 152A are commonly connected together and connected for receiving source of operating potential $V_{DD}$. The drain terminal of transistor 150A is connected to the drain terminal of transistor 154 and the drain terminal of transistor 152A is connected to the drain terminal of transistor 154 through switch 156. It should be noted that transistor 150A is analogous to current source 150 and transistor 152A is analogous to current source 152.

Reference setting circuit 200 includes an amplifier 212 having an inverting input terminal, a noninverting input terminal, and an output terminal, where the noninverting input terminal is connected to a bandgap reference (BGR) circuit 214 and the output terminal is connected to a transistor 210. More particularly, transistor 210 has a gate terminal connected to the output terminal of amplifier 212, a source terminal connected to the inverting input terminal of amplifier 212, and a drain terminal connected to the drain terminal of transistor 204. Amplifier 212 is connected in a voltage follower configuration. The source terminal of transistor 210 is connected to source of operating potential $V_{SS}$ through a resistor 206, where resistor 206 has a terminal commonly connected to the source terminal of transistor 210 and to the inverting input terminal of amplifier 212 to form a node 216 at which a voltage $V_1$ appears. The other terminal of resistor 206 is connected to source of operating potential $V_{SS}$. By way of example source of operating potential $V_{SS}$ is ground.

It should be noted that reference setting circuit 200 includes a transistor $130_n$ having a gate terminal connected to the gate terminal of transistor 154, a source terminal coupled for receiving, for example, source of operating potential $V_{SS}$, and a drain terminal that serves as a current leg or current channel. Transistor $130_n$ is included to represent additional current mirror transistors that provide legs or channels that may be coupled to transistor 154. Examples of additional current mirror channels are the drain terminals of transistors $130_1$ and $130_2$ shown in FIG. 2 and transistors $130_1$, $130_2$, $130_3$, $130_4$, $130_5$, $130_6$, $130_7$, $130_8$, $130_9$, and $130_{10}$ shown in FIGS. 4 and 5. Thus, n represents an integer.

In operation, BGR circuit 214 and voltage follower 212 cooperate to generate a voltage $V_1$ at node 216. In response voltage $V_1$ a current $I_m$ is generated that flows through resistor 206. Current mirror 202 mirrors current $I_m$ to generate current $I_1$ flowing from the source terminal of transistor 150A and a current $I_2$ flowing from the source terminal of transistor 152A. Currents $I_1$ and $I_2$ can be adjusted by adjusting the sizes of transistors 150A and 152A. It should noted that currents $I_1$ and $I_2$ of FIG. 3 correspond to currents $I_{150}$ and $I_{152}$ of FIG. 2. It should be appreciated that currents $I_1$ and $I_2$ can be used to confirm the state of the rotor at the time at which the rotor 18 starts rotating, i.e., detecting currents $I_1$ and $I_2$ indicates that the rotor of motor 12 is rotating. In addition, current $I_1$ can be used to detect the position of the rotor of motor 12 when it is rotating.

An advantage of including band gap reference circuit 214 is that band gap reference circuit 214 exhibits a low temperature drift.

Figure 4:
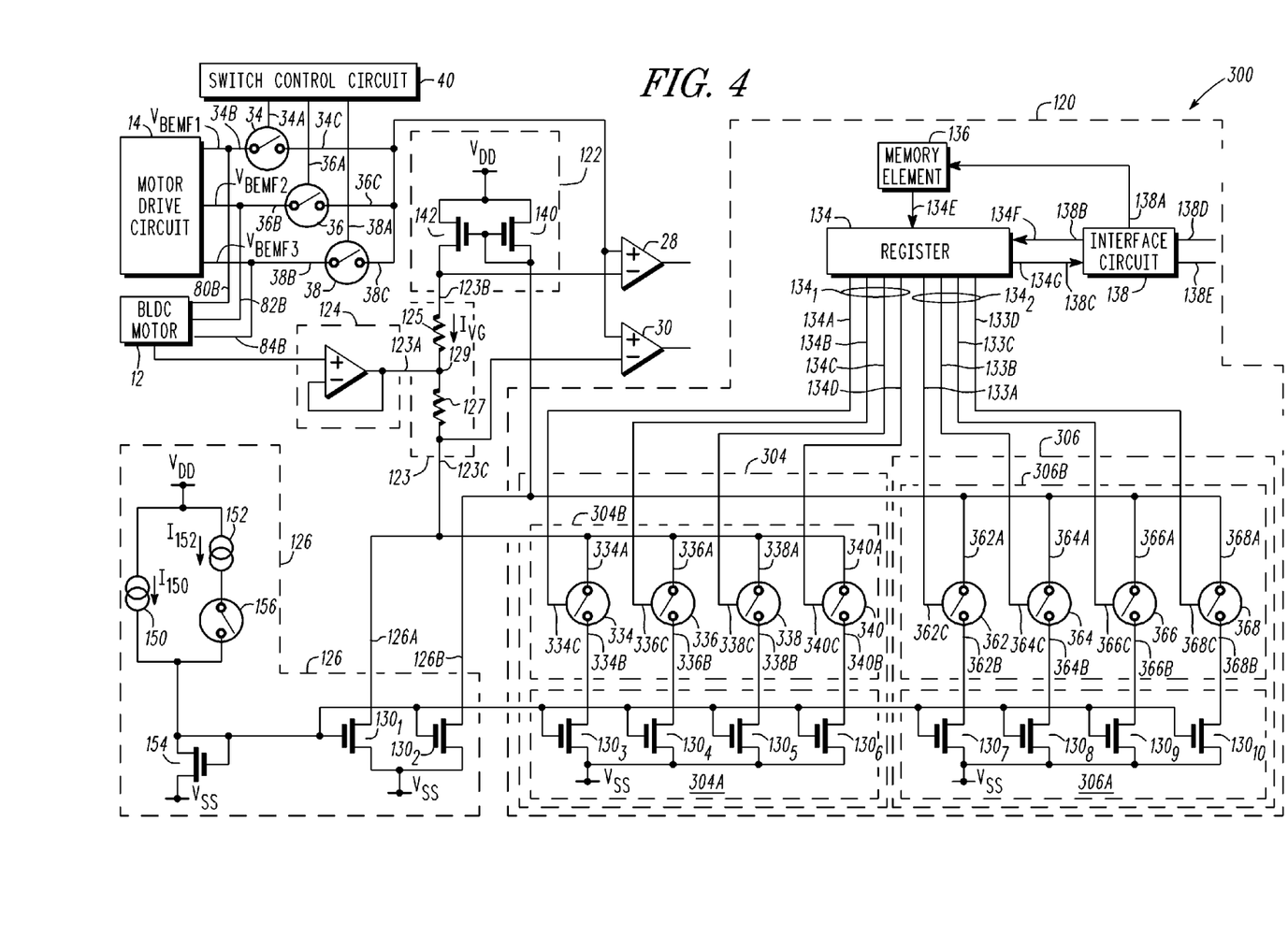
FIG. 4 is a circuit schematic of a detection circuit in accordance with an embodiment of the present invention.

FIG. 4 illustrates a circuit schematic of a detection circuit 300 in accordance with an embodiment of the present invention. It should be noted that detection circuit 300 may be coupled to a Brushless Direct Current (BLDC) motor 12 and to a motor drive circuit 14. Embodiments of BLDC motor 12 and motor drive circuit 14 are described with reference to FIGS. 1 and 2. Detection circuit 300 may be comprised of a trimming circuit 302, current mirror 122, voltage adjustment circuit 123, buffer amplifier 124, reference setting circuit 126, comparator 28, and comparator 30. In accordance with an embodiment, trimming circuit 300 is comprised of trimming elements 304 and 306, a register 134, a memory circuit 136, and an interface circuit 138. In accordance with the example of FIG. 4, trimming element 304 is comprised of a mirror section 304A connected to a switching section 304B and trimming element 306 is comprised of a mirror section 306A coupled to a switching section 306B. Switching section 304B may be referred to as a gating section and switching section 306B may be referred to as a gating section. It should be noted that register 134 has an output bus $134_1$ comprising terminals 134A, 134B, 134C, and 134D and an output bus $134_2$ comprising terminals 133A, 133B, 133C, and 133D.

Mirror section 304A is comprised of a plurality of transistors configured as mirroring legs. More particularly, the plurality of transistors of trimming element 120 includes transistors $130_3$, $130_4$, $130_5$, and $130_6$, wherein each of transistors $130_3$, $130_4$, $130_5$, and $130_6$ has a gate terminal, a drain terminal, and a source terminal. The gate terminals of transistors $130_3$, $130_4$, $130_5$, and $130_6$ are commonly connected together and to the gate terminals of transistors $130_1$ and $130_2$. Likewise, the source terminals of transistors $130_3$, $130_4$, $130_5$, and $130_6$ are commonly connected together and for receiving a source of operating potential $V_{SS}$. By way of example, the source of operating potential $V_{SS}$ is ground. Switching section 304B is comprised of a plurality of switches 334, 336, 338, and 340, where each switch has a control terminal and a pair current conducting terminals. Switch 334 has a control terminal 334C, a conduction terminal 334A, and a conduction terminal 334B, where control terminal 334C is connected to output terminal 134A of register 134, conduction terminal 334A is commonly connected to terminal 123C of voltage adjustment circuit 123 and to the drain terminal of transistor $130_1$, and conduction terminal 334B is connected to the drain terminal of transistor $130_3$. Switch 336 has a control terminal 336C, a conduction terminal 336A, and a conduction terminal 336B, where control terminal 336C is connected to output terminal 134B of register 134, conduction terminal 336A is commonly connected to terminal 123C of voltage adjustment circuit 123, to the drain terminal of transistor $130_1$, and to conduction terminal 334A of switch 334, and conduction terminal 336B is connected to the drain terminal of transistor $130_4$. Switch 338 has a control terminal 338C, a conduction terminal 338A, and a conduction terminal 338B, where control terminal 338C is connected to output terminal 134C of register 134, conduction terminal 338A is commonly connected to terminal 123C of voltage adjustment circuit 123, to the drain terminal of transistor $130_1$, and to conduction terminals 334A, 336A, and 338A, and conduction terminal 338B is connected to the drain terminal of transistor $130_5$. Switch 340 has a control terminal 340C, a conduction terminal 340A, and a conduction terminal 340B, where control terminal 340C is connected to output terminal 134D of register 134, conduction terminal 340A is commonly connected to terminal 123C of voltage adjustment 123, to the drain terminal of transistor $130_1$, and to conduction terminals 334A, 336A, and 338A, and conduction terminal 340B is connected to the drain terminal of transistor $130_6$.

Mirror section 306A is comprised of a plurality of transistors configured as mirroring legs. More particularly, the plurality of transistors of trimming element 306A includes transistors $130_7$, $130_8$, $130_9$, and $130_{10}$, wherein each of transistors $130_7$, $130_8$, $130_9$, and $130_{10}$ has a gate terminal, a drain terminal, and a source terminal. The gate terminals of transistors $130_7$, $130_8$, $130_9$, and $130_{10}$ are commonly connected together and to the gate terminals of transistors $130_1$, $130_2$, $130_3$, $130_4$, $130_5$, and $130_6$. The source terminals of transistors $130_7$, $130_8$, $130_9$, and $130_{10}$ are commonly connected together and for receiving a source of operating potential $V_{SS}$. By way of example, the source of operating potential $V_{SS}$ is ground.

Switching section 306B is comprised of a plurality of switches 362, 364, 366, and 368, where each switch has a control terminal and a pair current conducting terminals. Switch 362 has a control terminal 362C, a conduction terminal 362A, and a conduction terminal 362B, where control terminal 362C is connected to output terminal 133A of register 134, conduction terminal 362A is commonly connected to terminal 122B of current mirror 122 and to the drain terminal of transistor $130_2$, and conduction terminal 334B is connected to the drain terminal of transistor $130_7$. Switch 364 has a control terminal 364C, a conduction terminal 364A, and a conduction terminal 364B, where control terminal 364C is connected to output terminal 133B of register 134, conduction terminal 364A is commonly connected to terminal 122B of current mirror 122, to the drain terminal of transistor $130_2$, and to conduction terminal 362A of switch 362, and conduction terminal 364B is connected to the drain terminal of transistor $130_8$. Switch 366 has a control terminal 366C, a conduction terminal 366A, and a conduction terminal 366B, where control terminal 366C is connected to output terminal 133C of register 134, conduction terminal 366A is commonly connected to terminal 122B of current mirror 122, to the drain terminal of transistor $130_2$, and to conduction terminals 362A and 364A, and conduction terminal 366B is connected to the drain terminal of transistor $130_9$. Switch 368 has a control terminal 368C, a conduction terminal 368A, and a conduction terminal 368B, where control terminal 368C is connected to output terminal 133D of register 134, conduction terminal 368A is commonly connected to terminal 122B of current mirror 122, to the drain terminal of transistor $130_2$, and to conduction terminals 362A, 364A, and 366A, and conduction terminal 368B is connected to the drain terminal of transistor $130_{10}$.

Thus, the gate terminals of transistors $130_3$, $130_4$, $130_5$, $130_6$, $130_7$, $130_8$, $130_9$, and $130_{10}$ are connected to output terminal 126A of reference setting circuit 126 and thus to the gate terminals of transistors 154, $130_1$, $130_2$. In accordance with an embodiment the source terminals of transistors $130_1$, $130_2$, $130_3$, $130_4$, $130_5$, $130_6$, $130_7$, $130_8$, $130_9$, and $130_{10}$ are commonly connected together and for receiving a source of operating potential such as, for example, operating potential $V_{SS}$. The drain terminal of transistor $130_1$ is connected to terminal 123C of voltage adjustment circuit 123. The drain terminal of transistor $130_3$ is connected to output terminal 134A through a switch 334; the drain terminal of transistor $130_4$ is connected to output terminal 134B through a switch 336; the drain terminal of transistor $130_5$ is connected to output terminal 134C through a switch 338; and the drain terminal of transistor $130_4$ is connected to output terminal 134D through a switch 340. The drain terminal of transistor $130_2$ is connected to terminal 122B of current mirror 122. The drain terminal of transistor $130_7$ is connected to output terminal 133A through switch 362; the drain terminal of transistor $130_8$ is connected to output terminal 133B through switch 364; the drain terminal of transistor $130_9$ is connected to output terminal 133C through switch 366; and the drain terminal of transistor $130_{10}$ is connected to output terminal 133D through switch 368.

In operation, a method for sensorlessly detecting a rotor position of a motor includes generating a back electromotive force voltage at one or more of nodes 76, 78, and 80. The back electromotive force voltage is transferred to node 32 through switches 34, 36, and 38 under the control of switch control circuit 40. It should be noted that switch control circuit 40 generates control switches 34, 36, and 38 so that a single switch of switches 34, 36, and 38 is closed at a time, i.e., one of the back electromotive force voltages is transferred to node 32 at a time. The back electromotive force voltage appearing at node 32 also appears at the noninverting inputs of comparators 28 and 30. For example, a back electromotive force voltage is generated at node 76 in response to a drive signal from motor drive circuit 14. The back electromotive force signal is transferred or transmitted to the noninverting input terminal of comparators 28 and 30.

An upper reference voltage is generated at the inverting input of comparator 28 in response to a reference voltage and a current and a lower reference voltage is generated at the inverting input terminal of comparator 30 in response to the reference voltage and the current. Comparator 28 compares the back electromotive force voltage with the upper reference voltage to generate a comparison voltage at the output terminal of comparator 28. Comparator 30 compares the back electromotive force voltage with the lower reference voltage to generate a comparison voltage at the output terminal of comparator 30. A zero-cross detection signal is generated in response to the comparison voltage at the output terminal of comparator 28 and to the comparison voltage at the output terminal of comparator 30. The position information detection circuit generates a position indication signal in response to the zero-cross detection signal.

In accordance with embodiments, the upper reference voltage and the lower reference voltage may be generated by reference voltage generation circuit 123. More particularly, common voltage $V_{COM}$ is input into buffer amplifier 124, which generates a buffered common voltage $V_{BCOM}$ that appears at node 129. A current $I_{VG}$ flowing through voltage generation circuit 123 generates a voltage drop across resistor 125 and a voltage drop across resistor 127. Thus, the voltage at the inverting input terminal of comparator 28 is given by $V_{BCOM}+R_{125}*I_{VG}$ and the voltage at the inverting input terminal of comparator 30 is given by $V_{BCOM}-R_{127}*I_{VG}$, where $R_{125}$ is the resistance value of resistor 125 and $R_{127}$ is the resistance value of resistor 127. It should be noted that if the resistance value $R_{125}$ of resistor 125 equals the resistance value $R_{127}$ of resistor 127, the voltage across resistor 125 is equal to the voltage across resistor 127. In this case the voltage about voltage $V_{BCOM}$ is symmetric.

In the embodiment shown in FIG. 4, current $I_{VG}$ is generated in response to the currents at output terminals 126A and 126B of reference setting circuit 126 and the current flowing through switches 334, 336, 338, 340, 362, 364, 366, and 368 as determined by control signals from register 134. More particularly, register 134 may configure switches 334, 336, 338, 340, 362, 364, 366, and 368 such that current $I_{VG}$ includes a component from one or more of transistors $130_3$, $130_4$, $130_5$, $130_6$, $130_7$, $130_8$, $130_9$, and $130_{10}$. The current flowing through output terminals 126A and 126B may be further adjusted or refined in response to signals from reference setting circuit 126. More particularly, switch 156 may be configured to be open so that current $I_{150}$ is mirrored to output terminal 126A; alternatively, switch 156 may be configured to be closed so that a current equal to the sum of currents $I_{150}$ and $I_{152}$ is mirrored to output terminal 126A. Mirroring current $I_{150}$ to the output terminal allows detecting the motor rotor position when the motor is rotating, whereas mirroring a current equal to the sum of currents $I_{150}$ and $I_{152}$ enables confirming the motor rotor position at the time of starting the motor and judging the rotational state of the motor rotor. Thus, switch 156 may be controlled to adjust the offset level of the voltage at the input terminals of comparators 28 and 30.

In the embodiment shown in FIG. 4, current $I_{VG}$ is generated in response to the current at output terminals 126A and 126B of reference setting circuit 126 and the current flowing through switches 334, 336, 338, 340, 362, 364, 366, and 368 as determined by control signals from register 134. More particularly, register 134 may configure switches 334, 336, 338, 340, 362, 364, 366, and 368 such that current $I_{VG}$ includes a component from one or more of transistors $130_3$, $130_4$, $130_5$, $130_6$, $130_7$, $130_8$, $130_9$, and $130_{10}$.

It should be noted that comparators 28 and 30 are referenced to the middle point of the U phase, the V phase and the W phase of the back electromotive force voltage and that they are not affected by fluctuations in the common voltage $V_{COM}$. Thus, detection circuit 100 provides a structure for determining the zero-crossing point of the back electromotive force voltage.

It should be further noted that trimming circuit 120 enables adjusting the back electromotive force voltage detection offset voltage including the input offset voltage to comparators 28 and 30.

Figure 5A:
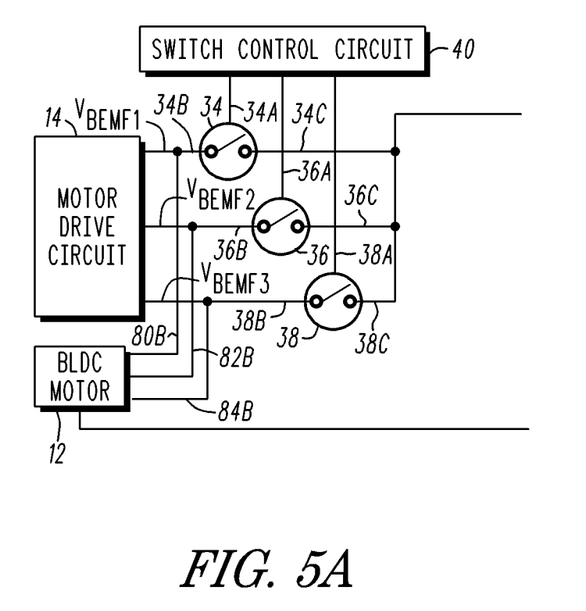
FIGS. 5A and 5B are a circuit schematic of a detection circuit in accordance with another embodiment of the present invention.
Figure 5B:
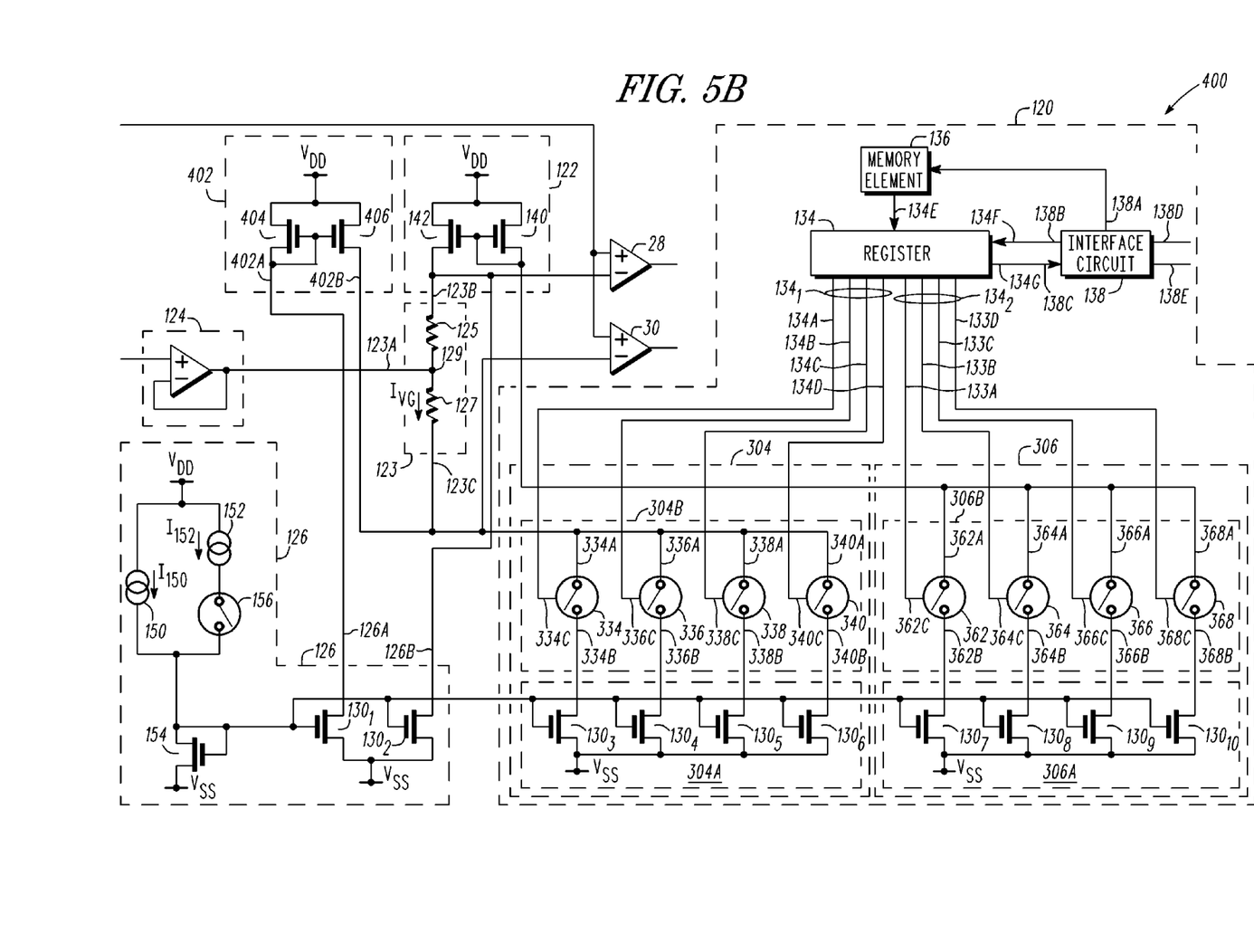

FIGS. 5A and 5B illustrate a circuit schematic of a detection circuit 400 in accordance with another embodiment of the present invention. It should be noted that BLDC motor 12 and motor drive circuit 14 are shown in FIG. 5A and detection circuit 400 is shown in FIG. 5B because the size of the circuit schematic is too large to be shown on a single drawing sheet without sacrificing clarity. Embodiments of BLDC motor 12 and motor drive circuit 14 are described with reference to FIGS. 1 and 2. Detection circuit 400 is comprised of a trimming circuit 302, a current mirror 122, a voltage adjustment circuit 123, a buffer amplifier 124, a reference setting circuit 126, a comparator 28, and a comparator 30. In accordance with an embodiment, trimming circuit 300 is comprised of trimming elements 304 and 306, a register 134, a memory circuit 136, and an interface circuit 138. By way of example, trimming element 304 is comprised of a plurality of transistors connected to corresponding plurality of switches and trimming element 306 is comprised of a plurality of transistors connected to corresponding plurality of switches.

FIG. 5A illustrates a portion of a circuit schematic of a Brushless Direct Current (BLDC) motor 12 connected to a motor drive circuit 14 and to a plurality of switches 34, 36, and 38 and FIG. 5B illustrates a detection circuit 400 connected to BLDC motor 12 and to motor drive circuit 14 in accordance with an embodiment of the present invention. Embodiments of BLDC motor 12 and motor drive circuit 14 are described with reference to FIGS. 1 and 2. Detection circuit 300 may be comprised of a trimming circuit 302, current mirror 122, a current mirror 402, a voltage adjustment circuit 123, buffer amplifier 124, reference setting circuit 126, comparator 28, and comparator 30. In accordance with an embodiment, trimming circuit 302 is comprised of trimming elements 304 and 306, a register 134, a memory circuit 136, and an interface circuit 138. In accordance with the example of FIGS. 5A and 5B, trimming element 304 is comprised of a mirror section 304A connected to a switching section 304B and trimming element 306 is comprised of a mirror section 306A coupled to a switching section 306B. Switching section 304B may be referred to as a gating section and switching section 306B may be referred to as a gating section. It should be noted that register 134 has an output bus $134_1$ comprising terminals 134A, 134B, 134C, and 134D and an output bus $134_2$ comprising terminals 133A, 133B, 133C, and 133D.

Current mirror 402 is comprised of transistors 404 and 406, where each of transistors 404 and 406 has a gate terminal, a drain terminal, and a source terminal. In accordance with the example of FIGS. 5A and 5B, the source terminals of transistors 404 and 406 are connected together and for receiving a source of operating potential $V_{DD}$ and the gate terminals of transistors 404 and 406 are connected together. The commonly connected gate terminals of transistors 404 and 406 are connected to the drain terminal of transistor 404 to form a terminal 402A. The drain terminal of transistor $130_1$ is connected to terminal 402A of current mirror 402. The drain terminal of transistor 406 serves as terminal 402B of current mirror 402 and is connected to terminal 123C of voltage adjustment circuit 123 and to conduction terminals 334A, 336A, 338A, and 340A of switches 334, 336, 338, and 340, respectively.

Terminal 122B of current mirror 122, i.e., the drain terminal of transistor 140, is connected to conduction terminals 362A, 364A, 366A, and 368A of switches 362, 364, 366, and 368, respectively.

Mirror section 304A is comprised of a plurality of transistors configured as mirroring legs. More particularly, the plurality of transistors of trimming element 304A includes transistors $130_3$, $130_4$, $130_5$, and $130_6$, wherein each of transistors $130_3$, $130_4$, $130_5$, and $130_6$ has a gate terminal, a drain terminal, and a source terminal. The gate terminals of transistors $130_3$, $130_4$, $130_5$, and $130_6$ are commonly connected together and to the gate terminals of transistors $130_1$ and $130_2$. Likewise, the source terminals of transistors $130_3$, $130_4$, $130_5$, and $130_6$ are commonly connected together and for receiving a source of operating potential $V_{SS}$. By way of example, the source of operating potential $V_{SS}$ is ground. Switching section 304B is comprised of a plurality of switches 334, 336, 338, and 340, where each switch has a control terminal and a pair of current conducting terminals. Switch 334 has a control terminal 334C, a conduction terminal 334A, and a conduction terminal 334B, where control terminal 334C is connected to output terminal 134A of register 134, conduction terminal 334A is commonly connected to terminal 123C of voltage adjustment circuit 123 and to the drain terminal of transistor $130_1$, and conduction terminal 334B is connected to the drain terminal of transistor $130_3$. Switch 336 has a control terminal 336C, a conduction terminal 336A, and a conduction terminal 336B, where control terminal 336C is connected to output terminal 134B of register 134, conduction terminal 336A is commonly connected to terminal 123C of voltage adjustment circuit 123, to the drain terminal of transistor $130_1$, and to conduction terminal 334A of switch 334, and conduction terminal 336B is connected to the drain terminal of transistor $130_4$. Switch 338 has a control terminal 338C, a conduction terminal 338A, and a conduction terminal 338B, where control terminal 338C is connected to output terminal 134C of register 134, conduction terminal 338A is commonly connected to terminal 123C of voltage adjustment circuit 123, to the drain terminal of transistor $130_1$, and to conduction terminals 334A, 336A, and 338A, and conduction terminal 338B is connected to the drain terminal of transistor $130_5$. Switch 340 has a control terminal 340C, a conduction terminal 340A, and a conduction terminal 340B, where control terminal 340C is connected to output terminal 134D of register 134, conduction terminal 340A is commonly connected to terminal 123C of voltage adjustment 123, to the drain terminal of transistor $130_1$, and to conduction terminals 334A, 336A, and 338A, and conduction terminal 340B is connected to the drain terminal of transistor $130_6$.

Mirror section 306A is comprised of a plurality of transistors configured as mirroring legs. More particularly, the plurality of transistors of trimming element 306A includes transistors $130_7$, $130_8$, $130_9$, and $130_{10}$, wherein each of transistors $130_7$, $130_8$, $130_9$, and $130_{10}$ has a gate terminal, a drain terminal, and a source terminal. The gate terminals of transistors $130_7$, $130_8$, $130_9$, and $130_{10}$ are commonly connected together and to the gate terminals of transistors $130_1$, $130_2$, $130_3$, $130_4$, $130_5$, and $130_6$. The source terminals of transistors $130_7$, $130_8$, $130_9$, and $130_{10}$ are commonly connected together and for receiving a source of operating potential $V_{SS}$. By way of example, the source of operating potential $V_{SS}$ is ground.

Switching section 306B is comprised of a plurality of switches 362, 364, 366, and 368, where each switch has a control terminal and a pair of current conducting terminals. Switch 362 has a control terminal 362C, a conduction terminal 362A, and a conduction terminal 362B, where control terminal 362C is connected to output terminal 133A of register 134, conduction terminal 362A is commonly connected to terminal 122B of current mirror 122 and to the drain terminal of transistor $130_2$, and conduction terminal 334B is connected to the drain terminal of transistor $130_7$. Switch 364 has a control terminal 364C, a conduction terminal 364A, and a conduction terminal 364B, where control terminal 364C is connected to output terminal 133B of register 134, conduction terminal 364A is commonly connected to terminal 122B of current mirror 122, to the drain terminal of transistor $130_2$, and to conduction terminal 362A of switch 362, and conduction terminal 364B is connected to the drain terminal of transistor $130_8$. Switch 366 has a control terminal 366C, a conduction terminal 366A, and a conduction terminal 366B, where control terminal 366C is connected to output terminal 133C of register 134, conduction terminal 366A is commonly connected to terminal 122B of current mirror 122, to the drain terminal of transistor $130_2$, and to conduction terminals 362A and 364A, and conduction terminal 366B is connected to the drain terminal of transistor $130_9$. Switch 368 has a control terminal 368C, a conduction terminal 368A, and a conduction terminal 368B, where control terminal 368C is connected to output terminal 133D of register 134, conduction terminal 368A is commonly connected to terminal 122B of current mirror 122, to the drain terminal of transistor $130_2$, and to conduction terminals 362A, 364A, and 366A, and conduction terminal 368B is connected to the drain terminal of transistor $130_{10}$.

Thus, the gate terminals of transistors $130_3$, $130_4$, $130_5$, $130_6$, $130_7$, $130_8$, $130_9$, and $130_{10}$ are connected to the gate terminals of transistors 154, $130_1$, $130_2$. In accordance with an embodiment the source terminals of transistors $130_1$, $130_2$, $130_3$, $130_4$, $130_5$, $130_6$, $130_7$, $130_8$, $130_9$, and $130_{10}$ may be commonly connected together and for receiving a source of operating potential such as, for example, operating potential $V_{SS}$. The drain terminal of transistor $130_1$ is connected to terminal 402A of current mirror 402. The drain terminal of transistor $130_3$ is commonly connected to terminal 402B of current mirror 402, terminal 123C of voltage adjustment circuit 123, and to the inverting input terminal of comparator 30 a switch 334; the drain terminal of transistor $130_4$ is commonly connected to terminal 402B of current mirror 402, terminal 123C of voltage adjustment circuit 123, and to the inverting input terminal of comparator 30 through a switch 336; the drain terminal of transistor $130_5$ is commonly connected to terminal 402B of current mirror 402, terminal 123C of voltage adjustment circuit 123, and to the inverting input terminal of comparator 30 through a switch 338; and the drain terminal of transistor $130_4$ is commonly connected to terminal 402B of current mirror 402, terminal 123C of voltage adjustment circuit 123, and to the inverting input terminal of comparator 30 through a switch 340. The drain terminal of transistor $130_2$ is connected to or, alternatively, serves as output terminal 126B, which is connected to terminal the drain terminal of transistor 142, i.e., to a terminal of current mirror 122, and to the inverting input terminal of comparator 28. The drain terminal of transistor $130_7$ is connected to the drain terminal of transistor 140 through switch 362; the drain terminal of transistor $130_8$ is connected to the drain terminal of transistor 140 through switch 364; the drain terminal of transistor $130_9$ is connected to the drain terminal of transistor 140 through switch 366; and the drain terminal of transistor $130_{10}$ is connected to the drain terminal of transistor 140 through switch 368.

In operation, a method for sensorlessly detecting a rotor position of a motor includes generating a back electromotive force voltage at one or more of nodes 76, 78, and 80. The back electromotive force voltage is transferred to node 32 through switches 34, 36, and 38 under the control of switch control circuit 40. It should be noted that switch control circuit 40 generates control switches 34, 36, and 38 so that a single switch of switches 34, 36, and 38 is closed at a time, i.e., one of the back electromotive force voltages is transferred to node 32 at a time. The back electromotive force voltage appearing at node 32 also appears at the noninverting inputs of comparators 28 and 30. For example, a back electromotive force voltage is generated at node 76 in response to a drive signal from motor drive circuit 14. The back electromotive force signal is transferred or transmitted to the noninverting input terminal of comparators 28 and 30.

An upper reference voltage is generated at the inverting input of comparator 28 in response to a reference voltage and a current and a lower reference voltage is generated at the inverting input terminal of comparator 30 in response to the reference voltage and the current. Comparator 28 compares the back electromotive force voltage with the upper reference voltage to generate a comparison voltage at the output terminal of comparator 28. Comparator 30 compares the back electromotive force voltage with the lower reference voltage to generate a comparison voltage at the output terminal of comparator 30. A zero-cross detection signal is generated in response to the comparison voltage at the output terminal of comparator 28 and to the comparison voltage at the output terminal of comparator 30. The position information detection circuit generates a position indication signal in response to the zero-cross detection signal.

In accordance with embodiments, the upper reference voltage and the lower reference voltage may be generated by reference voltage generation circuit 123. More particularly, common voltage $V_{COM}$ is input into buffer amplifier 124, which generates a buffered common voltage $V_{BCOM}$ that appears at node 129. A current $I_{VG}$ flowing through voltage generation circuit 123 generates a voltage drop across resistor 125 and a voltage drop across resistor 127. Thus, the voltage at the inverting input terminal of comparator 28 is given by $V_{BCOM}+R_{125}*I_{VG}$ and the voltage at the inverting input terminal of comparator 30 is given by $V_{BCOM}-R_{127}*I_{VG}$, where $R_{125}$ is the resistance value of resistor 125 and $R_{127}$ is the resistance value of resistor 127. It should be noted that if the resistance value $R_{125}$ of resistor 125 equals the resistance value $R_{127}$ of resistor 127, the voltage across resistor 125 is equal to the voltage across resistor 127. In this case the voltage about voltage $V_{BCOM}$ is symmetric.

In the embodiment shown in FIG. 5, current $I_{VG}$ is generated in response to the currents at output terminals 126A and 126B of reference setting circuit 126 and the current flowing through switches 334, 336, 338, 340, 362, 364, 366, and 368 as determined by control signals from register 134. More particularly, register 134 may configure switches 334, 336, 338, 340, 362, 364, 366, and 368 such that current $I_{VG}$ includes a component from one or more of transistors $130_3$, $130_4$, $130_5$, $130_6$, $130_7$, $130_8$, $130_9$, and $130_{10}$. The current flowing through output terminals 126A and 126B may be further adjusted or refined in response to signals from reference setting circuit 126. More particularly, switch 156 may be configured to be open so that current $I_{150}$ is mirrored to output terminal 126A; alternatively, switch 156 may be configured to be closed so that a current equal to the sum of currents $I_{150}$ and $I_{152}$ is mirrored to output terminal 126A. Mirroring current $I_{150}$ to the output terminal allows detecting the motor rotor position when the motor is rotating, whereas mirroring a current equal to the sum of currents $I_{150}$ and $I_{152}$ enables confirming the motor rotor position at the time of starting the motor and judging the rotational state of the motor rotor. Thus, switch 156 may be controlled to adjust the offset level of the voltage at the input terminals of comparators 28 and 30.

In the embodiment shown in FIGS. 5A and 5B, current $I_{VG}$ is generated in response to the current at output terminals 126A and 126B of reference setting circuit 126 and the current flowing through switches 334, 336, 338, 340, 362, 364, 366, and 368 as determined by control signals from register 134. More particularly, register 134 may configure switches 334, 336, 338, 340, 362, 364, 366, and 368 such that current $I_{VG}$ includes a component from one or more of transistors $130_3$, $130_4$, $130_5$, $130_6$, $130_7$, $130_8$, $130_9$, and $130_{10}$.

It should be noted that comparators 28 and 30 are referenced to the middle point of the U phase, the V phase and the W phase of the back electromotive force voltage and that they are not affected by fluctuations in the common voltage $V_{COM}$. Thus, detection circuit 100 provides a structure for determining the zero-crossing point of the back electromotive force voltage.

It should be further noted that trimming circuit 120 provides enables adjusting the back electromotive force voltage detection offset voltage including the input offset voltage to comparators 28 and 30.

By now it should be appreciated that a motor rotor position detection circuit and a method for detecting the position of the motor rotor have been provided. In accordance with an embodiment, the motor rotor position detection circuit includes a reference setting circuit connected to a trimming circuit and to a reference voltage generation circuit. The reference voltage generation circuit is connected to one or more comparators. In accordance with another embodiment, a method for sensorlessly detecting a rotor position of a motor is provided that includes generating a first voltage in response to a first back electromotive force, generating a second voltage in response to a common voltage from the motor, and generating a third voltage in response to the common voltage from the motor. The first voltage is compared to a second voltage to generate a comparison voltage and to a second voltage to generate another comparison voltage. The comparison voltages are used to generate a position detection signal.

The motor rotor position detection circuit is configured to set a comparator reference voltage by adjusting the current at output 126A to be equal to current $I_{150}$ or to be equal to the sum of currents $I_{150}$ and $I_{152}$.

In accordance with embodiments in which the current flowing through resistors 125 and 127 is substantially equal to the sum of currents $I_{150}$ and $I_{152}$, and resistors 125 and 127 have the same resistance value, a symmetric voltage about node 129 may be generated, i.e., the voltage at the inverting input terminal of comparator 28 is greater than the voltage at node 29 by the same amount that the voltage at the inverting input terminal of comparator 30 is less than the voltage at node 29.

In an example in which reference setting circuit 126 is configured to generate a current flowing through resistors 125 and 127 equal to the sum of currents $I_{150}$ and $I_{152}$, and resistors 125 and 127 are selected to have equal resistance values and to satisfy the equation $(I_{150}+I_{152})*R_{125}=+/-50$ mV, the state at the time of starting the motor rotating is confirmed and when the motor rotation is detected to be above a prescribed voltage, the rotation state is judged to be within +/−50 mV, the motor is determined to be stopped.

In an example in which the current setting is configured such that the equation $I_{VG}*R_{125}=I_{VG}*R_{127}=+/-10$ mV, the magnet position is detected when the motor is rotating and the comparator threshold is set to mitigate chattering.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A motor rotor position detection circuit, comprising:
   a reference setting circuit having at least a first terminal and a second terminal;
   a trimming circuit having at least a first terminal, a second terminal, and a third terminal, the first terminal of the trimming circuit coupled to the reference setting circuit;
   a reference voltage generation circuit having an input terminal, a first terminal, and a second terminal; and
   a first comparator having a first input terminal, a second input terminal, and an output terminal, the first input terminal of the first comparator coupled for receiving a first motor signal and the second input terminal of the first comparator coupled to the second terminal of the reference voltage generation circuit.

2. The motor rotor position detection circuit of claim 1, wherein the trimming circuit comprises:

a register having at least a first terminal, a second terminal, a third terminal, and a fourth terminal, the first terminal of the register serving as the first terminal of the trimming circuit;

a memory element having an input terminal and an output terminal, the output terminal of the memory element coupled to the second terminal of the register; and an interface circuit having at least a first terminal, a second terminal, and a third terminal, the first terminal of the interface circuit coupled to the third terminal of the register.

3. The motor rotor position detection circuit of claim 1, wherein, the first terminal of the voltage adjustment circuit is coupled to the first terminal of the reference setting circuit, and wherein the reference voltage generation circuit comprises:

a first resistor having a first terminal and a second terminal; and a second resistor having a first terminal and a second terminal, the first terminal of the second resistor coupled to the second terminal of the first resistor, the first terminal of the first resistor coupled to the second input terminal of the first comparator circuit, and the second terminal of the second resistor coupled to the first terminal of the reference setting circuit.

4. The motor rotor position detection circuit of claim 3, further including a first current mirror having a first current conducting terminal and a second current conducting terminal, the first current conducting terminal of the first current mirror coupled to the first terminal of the first resistor.

5. The motor rotor position detection circuit of claim 1, wherein the second terminal of the reference setting circuit is coupled to the second terminal of the first current mirror, and wherein the back electromotive force detection circuit further includes a second comparator having a first input terminal, a second input terminal, and an output terminal, the first input terminal of the second comparator coupled to the first input terminal of the first comparator, and the second input terminal of the second comparator coupled to the first terminal of the reference voltage generation circuit.

6. The motor rotor position detection circuit of claim 5, wherein the reference setting circuit further comprises:

a first current source having a first terminal and a second terminal;

a second current source having a first terminal and a second terminal, the first terminal of the second current source coupled to the first terminal of the first current source;

a first switch having a control terminal, a first conduction terminal, and a second conduction terminal, the first conduction terminal of the first switch coupled to the second terminal of the second current source and the second conduction terminal of the first switch coupled to the second terminal of the first current source; and a first transistor having a control terminal, a first current carrying terminal, and a second current carrying terminal, the control terminal of the first transistor coupled to first current carrying terminal of the first transistor, to the second terminal of the first current source, and to the second terminal of the second current source, and the second current carrying terminal of the first transistor coupled for receiving a first source of operating potential.

7. The motor rotor position detection circuit of claim 6, wherein the reference setting circuit further comprises a second transistor having a control terminal, a first current carrying terminal, and a second current carrying terminal, the control terminal of the second transistor coupled to the control terminal of the first transistor, the second current carrying terminal of the second transistor coupled for receiving the first source of operating potential, wherein the first current carrying terminal of the second transistor serves as the first output terminal of the reference setting circuit.

8. The motor rotor position detection circuit of claim 7, wherein the reference setting circuit further comprises a third transistor having a control terminal, a first current carrying terminal, and a second current carrying terminal, the control terminal of the third transistor coupled to the control terminals of the first transistor and the second transistor, the second current carrying terminal of the second transistor coupled for receiving the first source of operating potential, wherein the first current carrying terminal of the third transistor serves as the second output terminal of the reference setting circuit.

9. The motor rotor position detection circuit of claim 8, wherein the trimming circuit further comprises:

a first set of transistors, wherein each transistor of the first set of transistors has a control terminal, a first current carrying terminal, and a second current carrying terminal, the control terminals of each transistor of the first plurality of transistors coupled to each other, and the second current carrying terminals of the first set of transistors coupled for receiving the first source of operating potential; and a first set of switches, wherein each switch of the first set of switches has a control terminal, a first conduction terminal, and a second conduction terminal, the first set of switches coupled to corresponding transistors of the first set of transistors.

10. The motor rotor position detection circuit of claim 9, wherein the a trimming circuit further comprises:

a second set of transistors, wherein each transistor of the second set of transistors has a control terminal, a first current carrying terminal, and a second current carrying terminal, the control terminals of each transistor of the second set of transistors coupled to each other, and the second current carrying terminals of the second set of transistors coupled for receiving the first source of operating potential; and a second set of switches, wherein each switch of the second set of switches has a control terminal, a first conduction terminal, and a second conduction terminal, the second set of switches coupled to corresponding transistors of the second set of transistors.

11. The motor rotor position detection circuit of claim 10, wherein the trimming circuit further comprises a register having a plurality of terminals; and wherein the first set of transistors comprises:

a fourth transistor having a control terminal, a first current carrying terminal, and a second current carrying terminal;

a fifth transistor having a control terminal, a first current carrying terminal, and a second current carrying terminal, the control terminal of the fifth transistor coupled to the control terminal of the fourth transistor;

a sixth transistor having a control terminal, a first current carrying terminal, and a second current carrying terminal, the control terminal of the sixth transistor coupled to the control of the fourth transistor; and a seventh transistor having a control terminal, a first current carrying terminal, and a second current carrying terminal, the control terminal of the seventh transistor coupled to the control of the fourth transistor; and wherein the second set of transistors comprises:

an eighth transistor having a control terminal, a first current carrying terminal, and a second current carrying terminal, the control terminal of the eighth transistor coupled to the control terminal of the fourth transistor;

a ninth transistor having a control terminal, a first current carrying terminal, and a second current carrying terminal, the control terminal of the ninth transistor coupled to the control terminal of the fourth transistor;

a tenth transistor having a control terminal, a first current carrying terminal, and a second current carrying terminal, the control terminal of the tenth transistor coupled to the control of the fourth transistor; and an eleventh transistor having a control terminal, a first current carrying terminal, and a second current carrying terminal, the control terminal of the eleventh transistor coupled to the control of the fourth transistor; and wherein the first set of switches comprises:

a second switch having a control terminal, a first conduction terminal, and a second conduction terminal, the first conduction terminal of the second switch coupled to the first terminal of the reference setting circuit, the second conduction terminal of the second switch coupled to the first current carrying terminal of the fourth transistor, and the control terminal of the second switch coupled to a first terminal of the plurality of terminals of the register;

a third switch having a control terminal, a first conduction terminal, and a second conduction terminal, the first conduction terminal of the third switch coupled to the first terminal of the reference setting circuit, the second conduction terminal of the third switch coupled to the first current carrying terminal of the fifth transistor, and the control terminal of the third switch coupled to a second terminal of the plurality of terminals of the register;

a fourth switch having a control terminal, a first conduction terminal, and a second conduction terminal, the first conduction terminal of the fourth switch coupled to the first terminal of the reference setting circuit, the second conduction terminal of the fourth switch coupled to the first current carrying terminal of the sixth transistor, and the control terminal of the fourth switch coupled to a third terminal of the plurality of terminals of the register; and a fifth switch having a control terminal, a first conduction terminal, and a second conduction terminal, the first conduction terminal of the fifth switch coupled to the first terminal of the reference setting circuit, the second conduction terminal of the fifth switch coupled to the first current carrying terminal of the seventh transistor, and the control terminal of the fifth switch coupled to a fourth terminal of the plurality of terminals of the register; and wherein the second set of switches comprises:

a sixth switch having a control terminal, a first conduction terminal, and a second conduction terminal, the first conduction terminal of the sixth switch coupled to the second terminal of the reference setting circuit, the second conduction terminal of the sixth switch coupled to the first current carrying terminal of the eighth transistor, and the control terminal of the sixth switch coupled to a fifth terminal of the plurality of terminals of the register;

a seventh switch having a control terminal, a first conduction terminal, and a second conduction terminal, the first conduction terminal of the seventh switch coupled to the second terminal of the reference setting circuit, the second conduction terminal of the seventh switch coupled to the first current carrying terminal of the ninth transistor, and the control terminal of the seventh switch coupled to a sixth terminal of the plurality of terminals of the register;

an eighth switch having a control terminal, a first conduction terminal, and a second conduction terminal, the first conduction terminal of the eighth switch coupled to the second terminal of the reference setting circuit, the second conduction terminal of the eighth switch coupled to the first current carrying terminal of the tenth transistor, and the control terminal of the eighth switch coupled to a seventh terminal of the plurality of terminals of the register; and a ninth switch having a control terminal, a first conduction terminal, and a second conduction terminal, the first conduction terminal of the ninth switch coupled to the second terminal of the reference setting circuit, the second conduction terminal of the ninth switch coupled to the first current carrying terminal of the eleventh transistor, and the control terminal of the ninth switch coupled to an eighth terminal of the plurality of terminals of the register.

12. The motor rotor position detection circuit of claim 1, wherein the voltage adjustment circuit comprises:

a first resistor having a first terminal and a second terminal; and a second resistor having a first terminal and a second terminal, the first terminal of the second resistor coupled to the second terminal of the first resistor, the first terminal of the first resistor coupled to the second input terminal of the first comparator circuit, and the second terminal of the second resistor coupled to the first terminal of the reference setting circuit; and wherein the back electromotive force detection circuit further includes:

a first current mirror having a first current conducting terminal and a second current conducting terminal, the first current conducting terminal of the first current mirror coupled to the first terminal of the first resistor;

a second current mirror having a first terminal and a second terminal, the first terminal of the second current mirror coupled to the first terminal of the reference setting circuit; wherein the trimming circuit further comprises a register having a plurality of terminals;

a first transistor having a control terminal, a first current carrying terminal, and a second current carrying terminal;

a second transistor having a control terminal, a first current carrying terminal, and a second current carrying terminal, the control terminal of the second transistor coupled to the control terminal of the first transistor;

a first switch having a control terminal, a first conduction terminal, and a second conduction terminal, the first conduction terminal of the first switch coupled to the first terminal of the reference setting circuit, the second conduction terminal of the first switch coupled to the first current carrying terminal of the first transistor, and the control terminal of the first switch coupled to a first terminal of the plurality of terminals of the register; and a second switch having a control terminal, a first conduction terminal, and a second conduction terminal, the first conduction terminal of the second switch coupled to the second terminal second current mirror, the second conduction terminal of the second switch coupled to the first current carrying terminal of the second transistor, and the control terminal of the second switch coupled to a second terminal of the plurality of terminals of the register.

13. A voltage detection circuit, comprising:
a current generation circuit having a first terminal, a second terminal, and a third terminal;
a current trimming circuit having a biasing terminal, a first control terminal, and a first current conduction terminal, the biasing terminal coupled to the third terminal of the current generation circuit;
a voltage divider circuit having a first terminal, a second terminal, and a node, the first terminal of the voltage divider circuit coupled to the first current conduction terminal;
a first current mirror having a first terminal and a second terminal, the first terminal of the first current mirror coupled to the second terminal of the voltage divider circuit; and
a first comparator having an inverting input terminal, a noninverting input terminal, and an output terminal, the noninverting input terminal of the first comparator coupled to the second terminal of the voltage divider circuit.

14. The voltage detection circuit of claim 13, further including a buffer circuit having an input terminal and an output terminal, the output terminal of the buffer circuit coupled to the node of the voltage divider circuit.

15. The voltage detection circuit of claim 13, wherein the current trimming circuit further comprises:
a first current trimming component comprising:
a first transistor having a control terminal, a first current carrying terminal, and a second current carrying terminal, the control terminal of the first transistor serving as the biasing terminal of the current trimming circuit; and
a first switch having a first control terminal, a first conduction terminal, and a second conduction terminal, the second conduction terminal of the first switch coupled to the first current carrying terminal of the first transistor, and the second conduction terminal of the first switch coupled to the first terminal of the voltage divider circuit.

16. The voltage detection circuit of claim 15, wherein the current trimming circuit further comprises:
a second current trimming component comprising:
a second transistor having a control terminal, a first current carrying terminal, and a second current carrying terminal, the control terminal of the second transistor serving as the biasing terminal of the current trimming circuit; and
a second switch having a first control terminal, a first conduction terminal, and a second conduction terminal, the second conduction terminal of the second switch coupled to the first current carrying terminal of the second transistor, and the second conduction terminal of the second switch coupled to the second terminal of the first current mirror.

17. The voltage detection circuit of claim 16, wherein the first current trimming component further comprises:
a third transistor having a control terminal, a first current carrying terminal, and a second current carrying terminal, the control terminal of the third transistor coupled to the control terminal of the first transistor; and
a third switch having a first control terminal, a first conduction terminal, and a second conduction terminal, the second conduction terminal of the third switch coupled to the first current carrying terminal of the third transistor, and the second conduction terminal of the third switch coupled to the first terminal of the voltage divider circuit, and wherein the second current trimming component further comprises:
a fourth transistor having a control terminal, a first current carrying terminal, and a second current carrying terminal, the control terminal of the fourth transistor coupled to the control terminal of the second transistor; and
a fourth switch having a first control terminal, a first conduction terminal, and a second conduction terminal, the second conduction terminal of the fourth switch coupled to the first current carrying terminal of the fourth transistor, and the second conduction terminal of the fourth switch coupled to the second terminal of the first current mirror.

18. The voltage detection circuit of claim 15, further comprising:
a second current mirror having a first terminal and a second terminal, the first terminal of the second current mirror coupled to the first terminal of the current generation circuit and the second terminal of the current mirror coupled to the first terminal of the voltage divider circuit, wherein the current trimming circuit further comprises:
a second current trimming component comprising:
a second transistor having a control terminal, a first current carrying terminal, and a second current carrying terminal, the control terminal of the second transistor serving as the biasing terminal of the current trimming circuit; and
a second switch having a first control terminal, a first conduction terminal, and a second conduction terminal, the second conduction terminal of the second switch coupled to the first current carrying terminal of the second transistor, and the second conduction terminal of the second switch coupled to the second terminal of the first current mirror.

19. A method for sensorlessly detecting a rotor position of a motor, comprising:
generating a first voltage in response to a first back electromotive force;
generating a second voltage in response to a common voltage from the motor;
generating a third voltage in response to the common voltage from the motor;
comparing the first voltage with the second voltage to generate a first comparison signal;
comparing the first voltage with the third voltage to generate a second comparison signal; and
generating a position detection signal in response to the first comparison signal and the second comparison signal.

20. The method of claim 19, wherein generating the second voltage and generating the first voltage comprises adjusting a current flowing through a voltage generation circuit to generate the first voltage and the second voltage.

* * * * *